Figure 1:
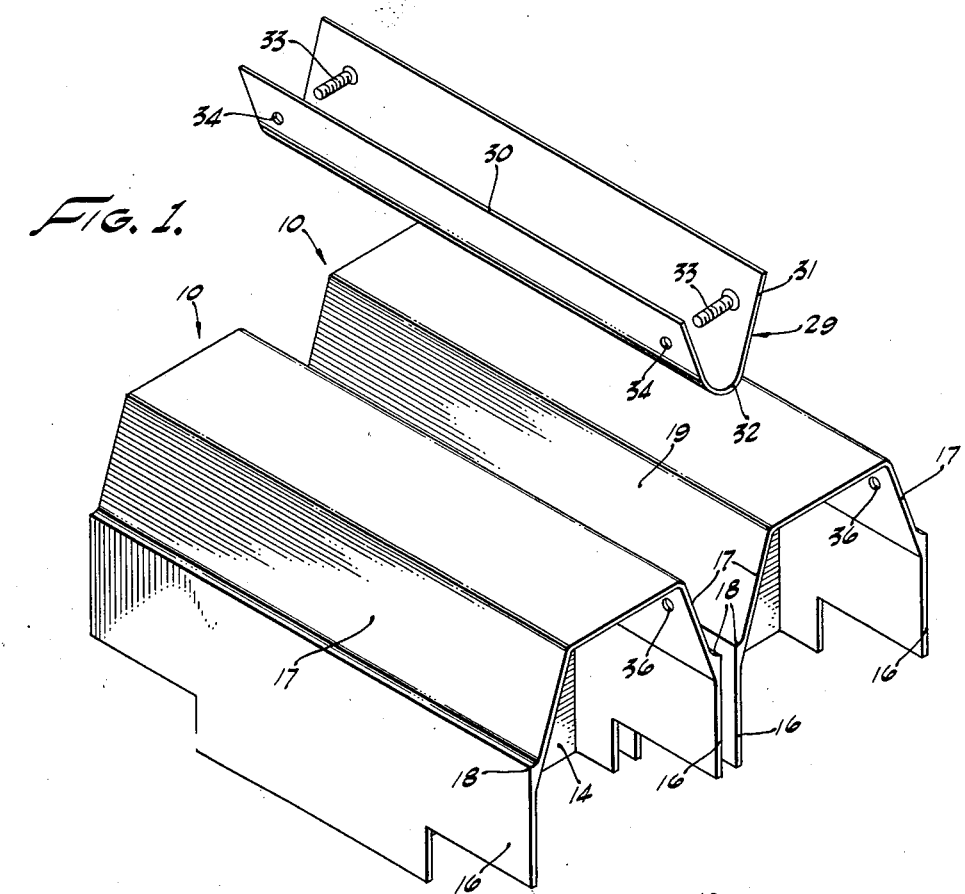

March 22, 1955  J. GORBY  2,704,594

FISH CONVEYOR

Filed Sept. 28, 1953

JACK GORBY
INVENTOR.

BY

ATTORNEY

United States Patent Office 2,704,594
Patented Mar. 22, 1955

2,704,594

FISH CONVEYOR

Jack Gorby, Los Angeles, Calif.

Application September 28, 1953, Serial No. 382,704

6 Claims. (Cl. 198—131)

This invention relates to a fish conveyor, and particularly to a device for adapting the pocket-forming components of a fish conveyor to individually transport either large or small sizes of substantially whole fish to various eviscerating and severing stations.

In cleaning sardines and other relatively small fish preparatory to canning them, it has become customary to transport individual fish to various stations where they are eviscerated and their heads and tails severed. A preferred conveyor for transporting the individual sardines comprises a plurality of blocks mounted transversely of a flexible chain or other suitable connecting means, with each pair of adjacent blocks being adapted to form between them a fish-carrying pocket. The shape and size of the conveyor blocks is necessarily governed by the type and size of fish to be cleaned, so that the pockets between the blocks will be of larger size when the fish being processed are relatively long and heavy, and will be small when the smaller types of sardines are being treated.

With the construction in which the fish-carrying pockets are formed between adjacent blocks which are individually mounted on an underlying chain, the pockets are of uniform and unvarying size when the chain is passing along a relatively straight portion of the conveyor. When, however, the chain is passing over a sprocket, for example at the discharge end of the apparatus, the blocks separate a substantial distance to increase the pocket size and to form gaps beneath the pockets. Although this is not serious when the fish being treated are of the size for which the apparatus was designed, it becomes critical when an attempt is made to treat smaller sizes of fish. This is because the increase in pocket size and the formation of the relatively wide gaps permit the small fish to fall into and through the gaps where they may be pinched and otherwise mangled.

In view of the above factors characteristic of the field of fish conveyors of the type indicated, it is an object of the present invention to provide a fish conveyor which may be readily adapted for transporting various sizes of sardines and other fish without danger of pinching or crushing them.

A further object is to provide a means for adapting a block-type fish conveyor to carry, without possibility of damage, fish substantially smaller than those for which the apparatus was designed.

An additional object of the invention is to provide means for increasing greatly the field of operation of the relatively expensive fish conveying and processing apparatus already existing in fish canning factories, so that a variety of types and sizes of fish may be treated by the same conveying equipment to reduce the over-all machine overhead rate per unit of fish treated.

These and other objects and advantages of the invention will be more fully set forth in the following specification and claims considered in connection with the attached drawing to which they relate.

Figure 2:
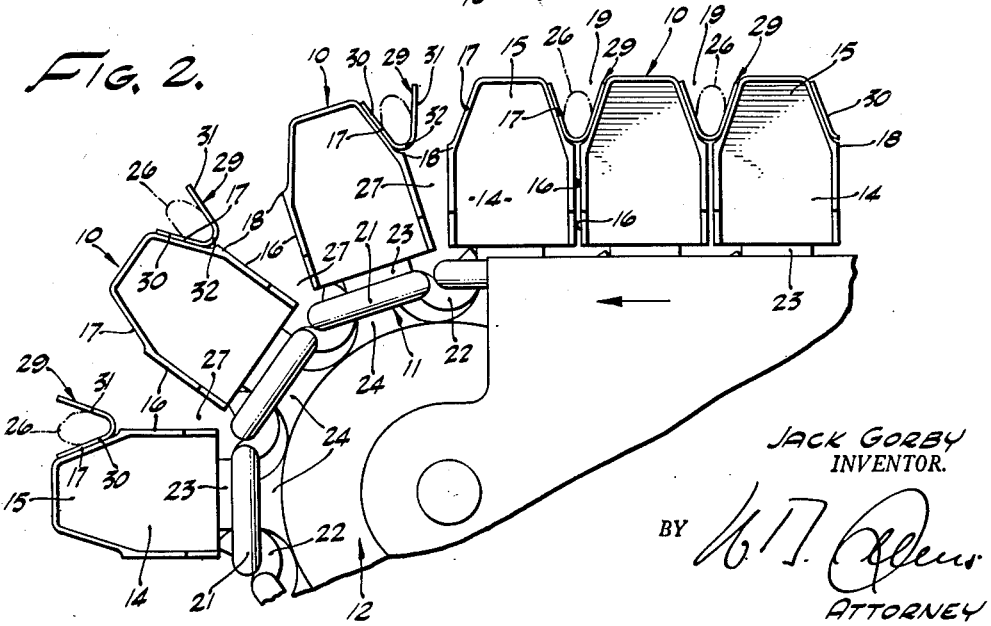

In the drawing:

Figure 1 is an exploded isometric view illustrating the manner of mounting a carrying clip on one of a pair of conventional conveyor blocks; and Figure 2 is a side elevational view illustrating the carrying clips as mounted on the conveyor blocks, and showing the gaps formed between the blocks as they pass around the discharge sprocket of the apparatus.

Referring to the drawing, the fish conveyor is illustrated as comprising, in general, a plurality of blocks 10 mounted adjacent each other and transversely of an underlying connecting linkage 11 which is suitably driven or guided by rotatable elements one of which is indicated at 12. It is to be understood that the rotatable elements 12 are suitably journaled in the frame of the apparatus and are driven by a motor, not shown, to drive connecting linkage 11 and thus blocks 10. The individual fishes carried one between each pair of blocks 10 are in this way transported between unshown eviscerating, head-severing and tail-severing stations. The eviscerating station may include means to disembowel the fish, for example by applying a vacuum thereto; while the head and tail-severing stations, which may be disposed a substantial distance apart, may each comprise a knife wheel mounted at one edge of the conveyor to sever automatically the protruding fish head or tail.

The blocks 10 may be of either cast or sheet metal construction and each comprises an elongated body which is substantially shorter than the length of the fish the apparatus is designed to convey, so that the fish heads and tails project beyond the ends of the blocks for severing as above indicated. Preferably, the base portion of each block is square or rectangular in section, as shown at 14 in Figure 2, while the upper or crown portion 15 is either triangular or trapezoidal. The side walls 16 of base portions 14 merge with the faces 17 of the trapezoidal upper portions 15 at beads or lips 18. The lips 18 of adjacent blocks cooperate, when the blocks are on a straight portion of the conveyor, to form a rounded bottom of a fish-carrying pocket 19 defined by faces 17 and as illustrated at the right in Figure 2. In addition to being plane surfaces as shown in the drawing, the pocket side faces 17 may be suitably convergent to form a pocket of diminishing cross-sectional area or any other form as may be desired.

The connecting linkage 11 is preferably of a chain belt type comprising a plurality of rectangular links 21 each having one side associated through a hook 22 with the opposite side of the adjacent link. Each of the links 21 is adapted to mount a block 10, for example by means of legs 23 (Figure 2) welded therebetween. The transversely extending portions of each link 21 are spaced from each other a distance sufficient, even when the hooks 22 are in place as indicated, to receive teeth 24 of the rotatable element 12 which in this instance is illustrated as a sprocket wheel.

It will be observed upon reference to Figure 2 that the sizes of links 21 and of the blocks 10 mounted on them are such that the side walls 16 of block bases 14 are parallel and closely adjacent each other when the connecting linkage 11 is stretched in a common plane extending from the upper portion of sprocket wheel 12 to an associated sprocket wheel, not shown, at the other end of the apparatus. The triangular fish-carrying pockets 19 may then receive the individual unmutilated sardines or other fish, indicated schematically at 26 in Figure 2, without danger that they will drop between side walls 16 and become mutilated. It follows that when the fish 26 are on a straight portion of the conveyor they will pass between the eviscerating, head-severing and tail-severing stations without becoming damaged, and regardless of whether the fish are relatively large or relatively small in section. However, when the fish 26 are on a portion of the conveyor passing over the sprocket wheel 12, the links 21 are no longer in a common plane but instead pivot relative to each other and to substantial angles governed by the diameter of the sprocket wheel. As the links 21 pivot, the side walls 16 of base portions 14, and the side faces 17 of crown portions 15, become additionally separated by distances proportional to the spacing between them and the pivot axes. The pockets then become substantially larger than on the straight portion of the conveyor, and generally triangular gaps 27 are formed between base side walls 16. Gaps 27 are sufficiently large to receive fish 26 having cross-sectional areas substantially less than the areas of the fish for which the apparatus was designed, so that in the absence of any preventive means the fish tend to drop into the gaps 27 and may become pinched, crushed or otherwise mutilated. In this way fish which have already been thoroughly cleaned may be ruined before being discharged from the conveyor by dropping out of the pockets as the blocks 10 pass below the sprocket 12 which in this instance is at the discharge end of the apparatus.

According to the invention, means are provided to prevent the fish 26 from falling into the gaps 27 as blocks 10 pass over sprocket wheel 12, and regardless of the size of the fish. These means comprise carrying elements or clips 29 the walls of which are of the same shape and spacing as the faces 17 and lips 18 of blocks 10 when on the straight portion of the conveyor. More specifically, each clip 29 has one wall 30 adapted to be mounted in flatwise engagement with the rear face 17 of a block 10, and a second wall 31 adapted to come into flatwise engagement with the forward face 17 of the block 10 rearwardly adjacent the block on which the clip is mounted. The walls 30 and 31 are then disposed in a V and are connected by a rounded portion 32 corresponding to lips 18 when they are together. As indicated, each carrying clip is mounted on only one of the adjacent blocks 10, for example by screws 33 extending through spaced holes 34 in wall 30 and into corresponding threaded holes 36 in the rear face 17 of the conveyor block.

With the construction illustrated, each individual fish body 26 will rest against carrying clip walls 30 and 31 much as it would rest in a pocket 19 against block faces 17 when the blocks 10 are on the straight portion of the conveyor illustrated at the right in Figure 2. However, when the faces 17 and walls 16 of the blocks 10 separate during passing of the blocks over the sprocket wheel 12, the groove formed between carrying clip walls 30 and 31 remains unchanged in size, all of the separation being effected between each rear carrying clip wall 31 and the forward face 17 of the block 10 rearwardly adjacent to it. It follows that the fish 26 will remain in position and will not drop into the gaps 27 as blocks 10 pass over sprocket wheel 12, but will instead drop out of the conveyor in an unmutilated condition as the blocks pass beneath the sprocket wheel.

In the operation of the fish-conveying apparatus, let it be assumed that a run of relatively large sardines or other fish are to be processed, the fish being of substantially the size for which the conveyor was originally designed. No carrying clips 29 need then be employed, the individual fish bodies 26, which are substantially larger than those illustrated in Figure 2, instead resting between the side faces 17 of the upper portions 15 of blocks 10. The sprocket wheel 12 is then driven counterclockwise to operate through connecting linkage 11 to move blocks 10 to the left in Figure 2 and between various eviscerating and severing stations where the fish are disemboweled and their heads and tails severed. After the eviscerating and severing operations are completed, the fish 26 approach the illustrated discharge end of the conveyor and pass around the sprocket wheel 12 where they drop, by the effect of gravity, into a discharge element, not shown. Because of the relatively large cross-sectional area of the fish, there is relatively little chance of pinching between the walls 16 of block bases 14 as the sprocket is traversed.

When it is desired to process a run of relatively small fish, a carrying clip 29 is mounted on the rear face 17 of each conveyor block 10 by inserting the screws 33 through holes 34 and 36. The sardines are then placed in the grooves formed between the walls 30 and 31 of the carrying clips 29, after which they are processed in substantially the manner as indicated above. As the individual fish bodies 26 are conveyed over the sprocket wheel 12, at which the blocks 10 separate due to the pivoting of links 21 relative to each other, there is no possibility that the fish 26 will drop into the gaps 27 where they may be pinched by the walls 16 and chain belt, since the walls of the carrying clips effectively prevent this action. Accordingly, the fish will drop out by the effect of gravity into the discharge element without being subject to any pinching or mutilating action.

It is to be understood that each of the blocks 10 and carrying clips 29 may, if desired, be formed in individual components separated by transverse slots to receive suitable knives or other processing elements. In this way, relatively short fish which would not protrude from the ends of the pockets may nevertheless be operated upon by suitable head and tail severing knives adapted to fit into the slots.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In a fish conveyor apparatus, flexible connecting means adapted for movement in a given direction and over a curved path between various fish treating stations, a plurality of blocks mounted on said connecting means transversely of said direction of movement, said blocks being shaped so that each pair of adjacent blocks forms a pocket therebetween adapted to hold an individual fish of a predetermined relatively large size, means to actuate said connecting means over said curved path with incident variations in the spacing between said blocks and the sizes of said pockets, and means removably mounted on said blocks for holding fish of a smaller size in position regardless of said variations in block spacing and in the sizes of said pockets.

2. In a fish conveyor apparatus, flexible connecting means adapted for movement in a given direction and over a curved path between various fish treating stations, a plurality of blocks mounted on said connecting means transversely of said direction of movement, said blocks being shaped with pocket-forming faces so that each pair of adjacent blocks forms a pocket therebetween adapted to support an individual fish, means to actuate said connecting means over said curved path with incident variations in the spacing between said blocks and the sizes of said pockets, and a carrying element mounted in each of said pockets and connected to only one of the adjacent blocks of each pair to provide a fish support of unvarying size, said carrying elements being adapted to hold the fish in position in said pockets to prevent mutilation thereof regardless of variations in the sizes of said pockets.

3. The invention as claimed in claim 2, in which said connecting means is a chain belt each link of which is adapted to mount one of said blocks, and said actuating means is a sprocket wheel meshed with said belt on the opposite side thereof from said blocks.

4. A fish conveyor apparatus, comprising a sprocket wheel adapted to rotate in a given direction, a flexible chain belt mounted on said sprocket wheel, said chain belt having a curved portion meshed downwardly over said sprocket wheel and a relatively straight portion extending tangentially from the upper part of said sprocket wheel and in a direction opposite to the direction of movement of said upper sprocket wheel part, a plurality of conveyor blocks mounted adjacent each other transversely of said chain belt on the upper side thereof and having their upper portions shaped to form a fish-carrying pocket between each pair of adjacent conveyor blocks, said conveyor blocks being associated with the links of said chain belt in such a way that the lower portions of said blocks are closely adjacent each other when on said straight portion of said chain belt but are separated by gaps when on said curved portion of said chain belt, and means to prevent said fish from dropping out of said pockets and into said gaps when on said curved portion of said chain belt, said means comprising a carrying clip connected to only one of the two opposed pocket-forming surfaces of the upper portions of adjacent conveyor blocks.

5. The invention as claimed in claim 4, wherein said carrying clip is V-shaped in transverse section with the apex relatively adjacent said chain belt.

6. A fish conveyor apparatus, comprising a wheel adapted to rotate about a horizontal axis, an endless belt mounted on said wheel, said belt having a curved portion engaged downwardly over said wheel and a straight portion extending tangentially from the upper part of said wheel, a plurality of pocket-forming elements mounted adjacent each other on the outer side of said belt, said pocket-forming elements being shaped at their portions remote from said belt to form a fish-carrying pocket between each pair of adjacent pocket-forming elements, said fish-carrying pocket being of a size to receive a fish of relatively large predetermined size and a carrying clip mounted on one of each pair of pocket-forming elements and extending into said fish-carrying pocket, said clip being shaped to form a pocket of a size to receive a fish of relatively small predetermined size and to prevent such small fish from dropping between said pocket-forming elements.

References Cited in the file of this patent

UNITED STATES PATENTS

| | | |
|---|---|---|
| 733,558 | Schirmer | July 14, 1903 |
| 2,431,465 | Christiansen | Nov. 25, 1947 |